(12) United States Patent
Tseng

(10) Patent No.: US 7,751,098 B2
(45) Date of Patent: *Jul. 6, 2010

(54) LIGHT-CHANNELING APPARATUS AND METHOD

(76) Inventor: Jen-Shou Tseng, No. 18, Wen-Shen St., Chunan Chen, Miao-Li Hsien (TW)

( * ) Notice: Subject to any disclaimer, the term of this patent is extended or adjusted under 35 U.S.C. 154(b) by 23 days.

This patent is subject to a terminal disclaimer.

(21) Appl. No.: 11/694,522

(22) Filed: Mar. 30, 2007

(65) Prior Publication Data

US 2007/0229918 A1  Oct. 4, 2007

Related U.S. Application Data

(63) Continuation of application No. 10/065,384, filed on Oct. 11, 2002, now Pat. No. 7,274,495.

(51) Int. Cl.
*H04N 1/04* (2006.01)

(52) U.S. Cl. .................... 358/484; 358/475; 358/497; 358/474; 358/483; 250/227.11; 250/216; 250/208.1

(58) Field of Classification Search ............... 358/484, 358/475, 509, 505, 483, 482, 497, 494, 474; 358/512–514; 250/208.1, 216, 234–236, 250/227.11, 227.14, 239; 399/206, 211, 399/212, 221, 219; 382/312, 318, 319; 359/212
See application file for complete search history.

(56) References Cited

U.S. PATENT DOCUMENTS

| | | | | |
|---|---|---|---|---|
| 4,366,499 A * | 12/1982 | Mir | ............................. | 358/515 |
| 4,707,615 A * | 11/1987 | Hosaka | ....................... | 358/513 |
| 4,716,456 A * | 12/1987 | Hosaka | ....................... | 358/509 |
| 4,769,718 A * | 9/1988 | Imamura | ..................... | 358/482 |
| 5,019,897 A * | 5/1991 | Shirata et al. | ................ | 358/505 |
| 5,089,901 A * | 2/1992 | Kaneko | ....................... | 358/474 |
| 5,136,150 A * | 8/1992 | Fukushima et al. | ...... | 250/208.1 |
| 5,463,217 A * | 10/1995 | Sobol et al. | .................. | 250/234 |
| 5,737,096 A * | 4/1998 | Takeuchi et al. | ............. | 358/475 |
| 5,780,829 A * | 7/1998 | Tsai et al. | .................... | 235/454 |
| 5,995,243 A * | 11/1999 | Kerschner et al. | ........... | 358/461 |
| 6,028,682 A * | 2/2000 | Ott et al. | ...................... | 358/497 |
| 6,239,865 B1 * | 5/2001 | Paritsky et al. | ............. | 356/4.07 |
| 6,714,323 B1 * | 3/2004 | Onishi et al. | ................. | 358/475 |
| 7,253,427 B2 * | 8/2007 | Spears et al. | ........... | 250/559.38 |
| 7,274,495 B2 * | 9/2007 | Tseng | ......................... | 358/484 |

\* cited by examiner

*Primary Examiner*—Cheukfan Lee
(74) *Attorney, Agent, or Firm*—Stolowitz Ford Cowger LLP

(57) ABSTRACT

A scanning module includes a body casing having a light passage slit thereon, a plurality of reflecting mirrors located inside the body casing, a light-channeling apparatus, and a light guiding body. The light-channeling apparatus includes a first light-guiding tube positioned between a light source and a document, and a second light-guiding tube positioned between the document and the light passage slit. The light-guiding body is positioned inside the first light-guiding tube or the second light-guiding tube.

22 Claims, 3 Drawing Sheets

US 7,751,098 B2

LIGHT-CHANNELING APPARATUS AND METHOD

CROSS REFERENCE TO RELATED APPLICATIONS

This Application is a continuation application of U.S. application Ser. No. 10/065,384, filed Oct. 11, 2002 now U.S. Pat. No. 7,274,495. The entire disclosure of U.S. application Ser. No. 10/065,384 is considered as being part of the disclosure of the present application and is hereby incorporated by reference herein in its entirety.

BACKGROUND OF INVENTION

1. Field of Invention

The present invention relates to a light-channeling apparatus and method. More particularly, the present invention relates to a light-channeling tube capable of preventing light dispersion and shielding against outside sources of light interference.

2. Description of Related Art

Following the rapid progress in computer capability and the development of Internet and multimedia technologies, the transmission of documents and images has become an essential element in communication. Textual information or image patterns are captured by a peripheral device such as an optical scanner and then converted into digital data by an analogue/digital converter. The digital data is transferred to an image file that can be displayed, identified, edited, stored or output.

In general for a scanning system, the light source and the first reflecting mirror of a scanning module are exposed outside a scanning module and hence this is one of the major factors that affect scan quality. In other words, most of the light from a light source projected onto a document must be redirected onto the scanning region after reflection and the document image must be shielded against interference from external light sources so that the image is able to project onto the first reflecting mirror. Both are critical factors that determine the ultimate quality of the image as captured by the scanner. FIG. 1 is a schematic diagram showing the position of a light source 120 and a first reflection mirror 130 inside a conventional scanning module 100. As shown in FIG. 1, the light source 120 is installed inside a light source carrier 118 on a body casing 110. The first reflecting mirror 130, a second reflecting mirror 132, a third reflecting mirror 134, a lens 140 and a light-sensing device 150 is are enclosed inside the body casing 110. Viewed from the top, the light source 120 and the first reflecting mirror 130 underneath light passage slit 112 can be easily seen. The light source 120 is, for example, a daylight lamp having a long edge similar in length to a document 160. The slit 112 has a sufficient width that permits light reflected from the document 160 to project onto the first reflecting mirror.

The light source 120 must project a line of light onto the document 160 to form a scan line there. To prevent the dispersion of light, most scanning systems have a collimating lens 122 installed above the light source 120 so that light from the light source 120 is focused on the document 160 to form an intense scan line. Although the lens 122 focuses light from the light source 120, there is no guarantee that light will not be dispersed to the surrounding regions.

Similarly, there is no facilities facility around the slit 112 that prevents stray lights from external sources from projecting onto the first reflecting mirror 130 and interfering with the quality of the reflected light coming from the document 160. Ultimately, quality of the image may be affected.

SUMMARY OF INVENTION

Accordingly, one object of the present invention is to provide a light-channeling apparatus and method for guiding light from a light source to a document with very little dispersion and guiding the reflected light from the document through a passage slit onto a first reflecting mirror inside a body casing such that very little stray lights from external sources are is permitted entry into the body casing.

To achieve these and other advantages and in accordance with the purpose of the invention, as embodied and broadly described herein, the invention provides a light-channeling apparatus for a scanning module. The scanning module includes a light source and a body casing. The body casing has a passage slit for light. The light-channeling apparatus comprises of a first guiding tube and a second guiding tube. The first guiding tube is connected to the body casing and positioned between the light source and the document. The second light-guiding tube is also connected to the body casing but positioned between the document and the passage slit.

This invention also provides a scanning module for scanning a document. The scanning module mainly includes a body casing, a light source, a plurality of reflecting mirrors, a lens, a light-sensing device and a light-channel apparatus. The light source is mounted on the body casing for illuminating a document. The reflecting mirrors, the lens and the light-sensing device are enclosed inside the body casing. The light-channeling apparatus is connected to the body casing and that the light-channeling apparatus comprises of a first light-guiding tube and a second light-guiding tube. The first light-guiding tube is positioned between the light source and a document while the second light-guiding tube is positioned between the document and a light passage slit.

According to one preferred embodiment of this invention, the light-guiding tube can be a hollow tube whose interior walls have a reflective coating. In addition, a collimating Lens is also installed inside the first light-guiding tube.

According to another preferred embodiment of this invention, a light-guiding body may be incorporated inside the light-guiding tube. Furthermore, the document end of the first light-guiding tube and the document end of the second light-guiding tube may be physically connected together. Moreover, the light-guiding tube and the scanning module may be fabricated together as an integrative unit.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention, In the drawings.

DETAILED DESCRIPTION

Figure 1:
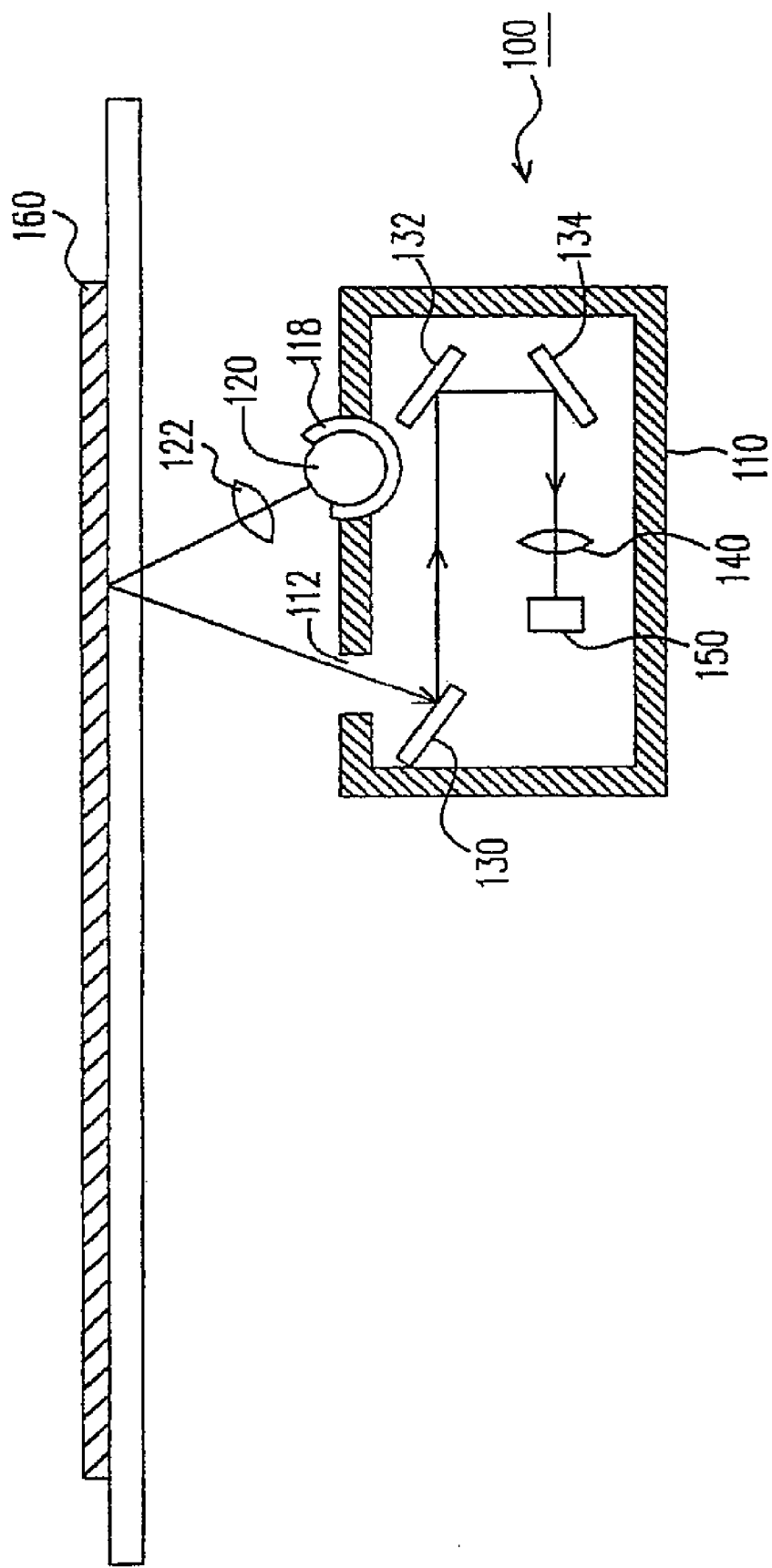
FIG. 1 is a schematic diagram showing the position of a light source and a first reflection mirror inside a conventional scanning module 100.

Reference will now be made in detail to the present preferred embodiments of the invention, examples of which are illustrated in the accompanying drawings. Wherever possible, the same reference numbers are used in the drawings and the description to refer to the same or like parts.

Figure 2:
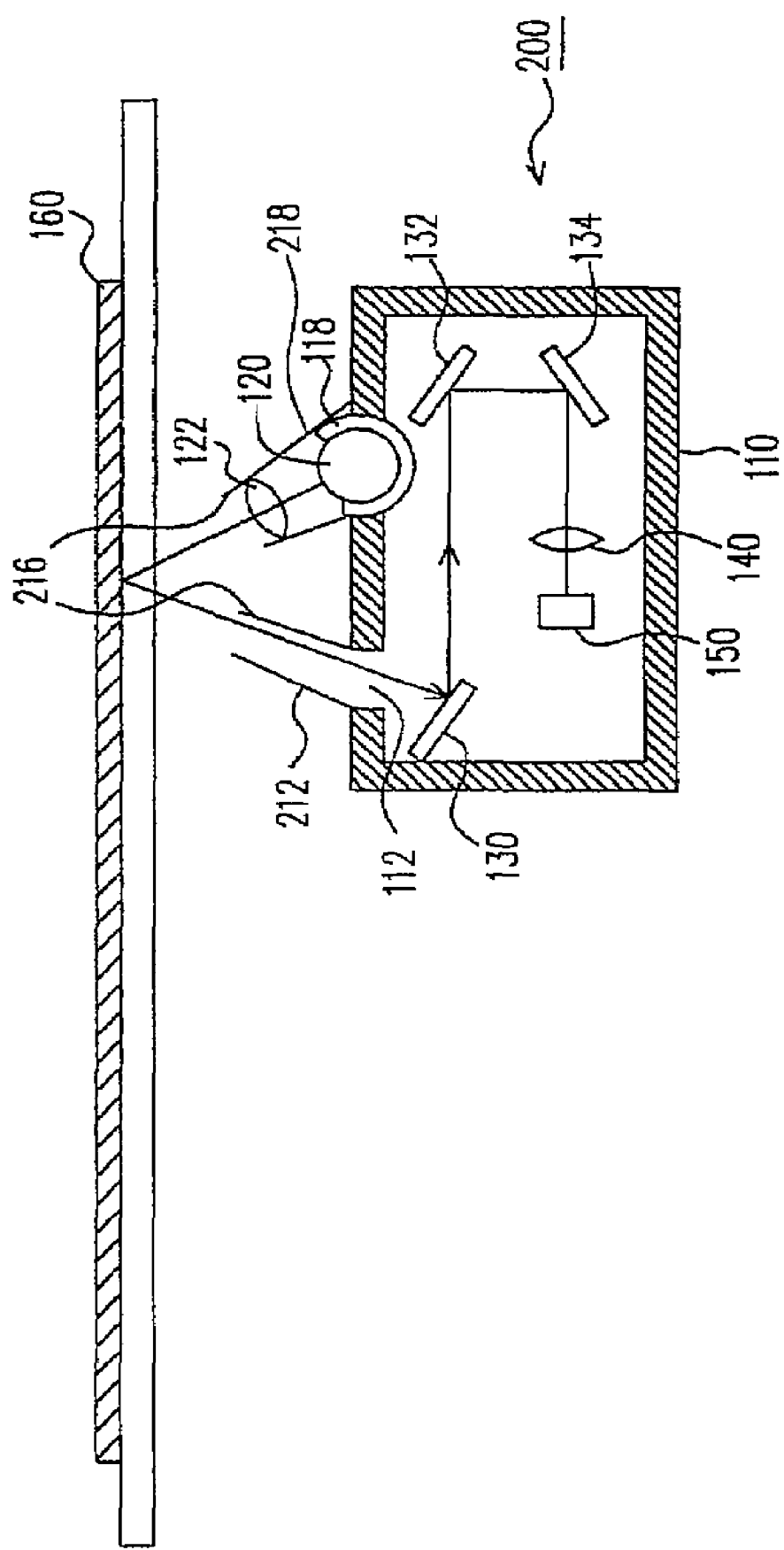
FIG. 2 is a schematic diagram showing various components of a scanning module according to one preferred embodiment of this invention.

FIG. 2 is a schematic diagram showing various components of a scanning module according to one preferred embodiment of this invention. As shown in FIG. 2, the scanning module 200 includes a body casing 10, a light source 120, three reflecting mirrors 130, 132, 134, a lens 140, a light-sensing device 150 and a light-channeling apparatus 210. The body casing 110 has a light passage slit 112. The light source 120 is mounted on a carrier base 118 on the body casing 110 for illuminating a document 160. The reflecting mirrors 130, 132, 134, the lens 140 and the light-sensing device 150 are all enclosed inside the body casing 110. The light-channeling apparatus 210 is attached to the body casing 110. The light-channeling apparatus 210 comprises of a pair of light-guiding tubes 212 and 218. The light-guiding tube 218 is positioned between the light source 120 and the document 160 while the light-guiding tube 212 is positioned between the document 160 and the slit 112.

As shown in FIG. 2, the light source 120 projects a beam of light towards the document 120. The beam of light reflects from the document 160 and enters the body casing 110 through the slit 112. After entering the body casing 110, the beam of reflected light projects in sequential order onto the first reflecting mirror 130, the second reflecting mirror 132 and the third reflecting mirror 134 before arriving at the lens 140. The lens focuses the beam onto the light-sensing device 150.

The light-guiding tubes 212, 218 have a hollow tube structure. When light from the light source 120 travels to the document 160, the light-guiding tube 218 focuses the beam of light on the document 160 and hence increases the luminance of the light beam. The light-guiding tube 212 channels the beam of reflected light from the document to the slit 112 before impinging upon the first reflecting mirror 130 inside the body casing 110. With this arrangement, very little light is dispersed and interference by strayed lights from external light sources is minimized.

Figure 3:
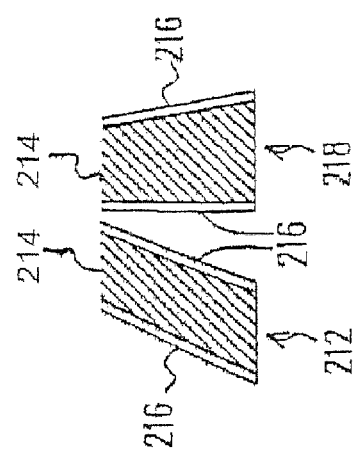
FIG. 3 is a cross-sectional view of the interior of a light-channeling apparatus according to one preferred embodiment of this invention.

FIG. 3 is a cross-sectional view of the interior of a light-channeling apparatus according to one preferred embodiment of this invention. To optimize the effects provided by the light-guiding tubes 212 and 218, a collimating lens 122 is installed inside the light-guiding tube 218 and the interior sidewalk of both light-guiding tubes 212 and 218 are coated with a reflective layer 216. Obviously, to increase light-focusing power, a light-guiding body 214 may also be incorporated inside the light-guiding tubes 212 and 218. In other words, the light-guiding tubes not only guide the light beam from the light source 120 to the first reflecting mirror 130, but also increase overall luminance level.

Figure 4:
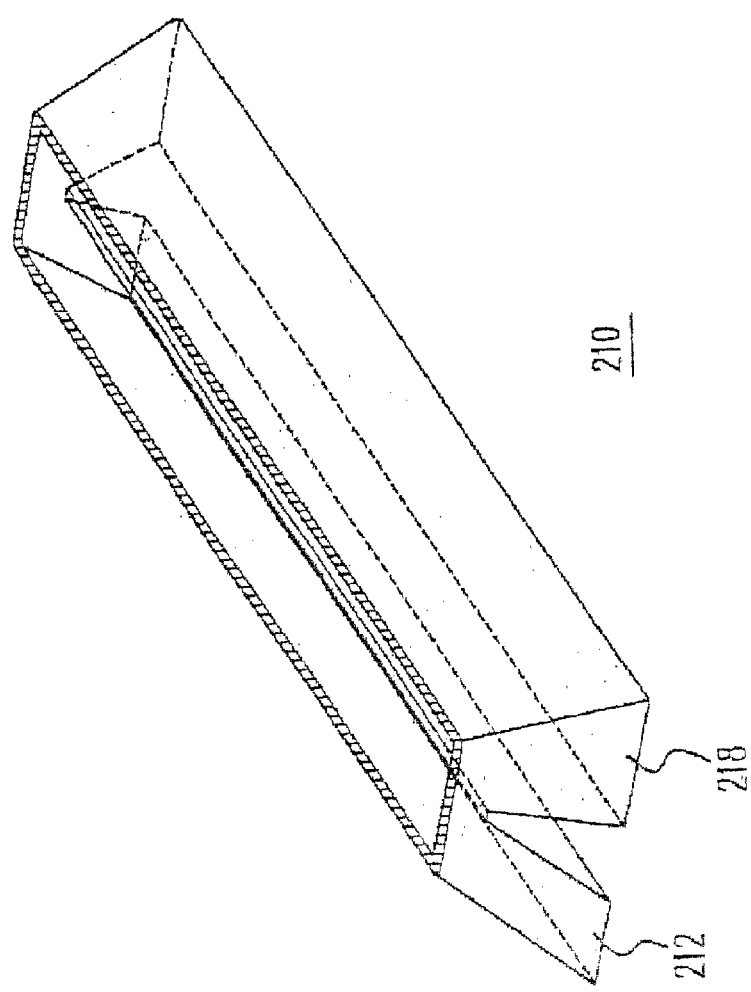
FIG. 4 is a perspective view of a light-channel apparatus according to one preferred embodiment of this invention.

FIG. 4 is a perspective view of a light-channel apparatus according to one preferred embodiment of this invention. One end of the light-guiding tubes 212 and 218 may be connected together to form the light-channeling apparatus 210 as shown in FIG. 4. In other words, the document end of the light-guiding tube 218 and the document end of the light-guiding tube 212 are joined together to facilitate installation. However, the light-guiding tubes and the scanning module may be fabricated together as an integrative unit to reduce production cost.

In summary, major advantages of the scanning module of this invention includes:

1. The light-guiding, tube of the light-channel apparatus focuses light from the light source on the document with a greater intensity.

2. The light-guiding tube of the light-channel apparatus also focuses the light reflected from the document through a slit into the body casing.

3. The scanning module is able to screen out unwanted interference from external light sources without incurring too much cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus comprising:
   a first light-guiding tube attached to a body casing, wherein the first light-guiding tube is positioned between a light source and a document;
   a second light-guiding tube attached to the body casing, wherein the second light-guiding tube is positioned between the document and a light passage slit in the body casing; and
   a collimating lens positioned inside the first light-guiding tube.

2. The apparatus of claim 1, wherein interior sidewalls of the first light-guiding tube have a reflective coating.

3. The apparatus of claim 1, wherein interior sidewalls of the second light-guiding tube have a reflective coating.

4. The apparatus of claim 1, wherein the first light-guiding tube or the second light-guiding tube has a hollow interior.

5. The apparatus of claim 1, wherein a document end of the first light-guiding tube and a document end of the second light-guiding tube are fused together.

6. The apparatus of claim 1 wherein the first light-guiding tube and the body casing are an integrated unit.

7. The apparatus of claim 1, wherein the second light-guiding tube and the body casing are an integrated unit.

8. The apparatus of claim 1, further comprising a light-guiding body, wherein the light-guiding body is positioned inside the first light-guiding tube or the second light-guiding tube.

9. The apparatus of claim 8, further comprising a second light-guiding body positioned inside the second light-guiding tube, wherein the light-guiding body is positioned inside the first light-guiding tube.

10. A scanning module comprising:
    a body casing having a light passage slit thereon;
    a plurality of reflecting mirrors located inside the body casing;
    a light-channeling apparatus comprising a first light-guiding tube positioned between a light source and a document, and a second light-guiding tube positioned between the document and the light passage slit; and
    a light-guiding body, wherein the light-guiding body is positioned inside the first light-guiding tube or the second light-guiding tube.

11. The scanning module of claim 10, wherein the interior sidewalls of the first light-guiding tube or the second light-guiding tube have a reflective coating.

12. The scanning module of claim 10, wherein the first light-guiding tube or the second light-guiding tube has a hollow interior.

13. The scanning module of claim 10, further comprising a collimating lens located inside the first light-guiding tube.

14. The scanning module of claim 10, wherein a document end of the first light-guiding tube and a document end of the second light-guiding tube are fused together.

15. The scanning module of claim 10, wherein the body casing is fabricated together with the first light-guiding tube or the second light-guiding tube as an integrated unit.

16. A scanning module, comprising:
   means for guiding light from a light source to a document via a first light-guiding tube;
   means for reflecting light from the document through a light passage slit into a body casing of the scanning module via a second light-guiding tube; and
   means for collimating light positioned inside the first light-guiding tube.

17. The scanning module of claim 16, further comprising:
   means for reflecting light via a reflective coating, wherein the reflective coating is provided on an interior wall of the first light-guiding tube or the second light-guiding tube.

18. The scanning module of claim 16, wherein the first light-guiding tube or the second light-guiding tube has a hollow interior.

19. The scanning module of claim 16, further comprising:
   means for joining a document end of the first light-guiding tube with a document end of a second light-guiding tube.

20. The scanning module of claim 16, further comprising:
   means for integrating the body casing with the first light-guiding tube or the second light-guiding tube to form an integrative unit.

21. The scanning module of claim 16, further comprising: means for increasing a luminance level of the light via a light-guiding body, wherein the light-guiding body is positioned inside the first light-guiding tube or the second light-guiding tube.

22. The scanning module of claim 21, further comprising a second light-guiding body, wherein the second-light-guiding body is positioned inside the second light-guiding tube, and wherein the light-guiding body is positioned inside the first light-guiding tube.

* * * * *